United States Patent [19]

Fowler et al.

[11] 4,382,281
[45] May 3, 1983

[54] HELICOPTER FORCE FEEL ACTUATOR AUTOMATIC STATIC NULL COMPENSATION

[75] Inventors: Donald W. Fowler, West Haven; Raymond J. Brand, Oxford; Douglas H. Clelford, Trumbull, all of Conn.

[73] Assignee: United Technologies Corporation, Hartford, Conn.

[21] Appl. No.: 176,833

[22] Filed: Aug. 8, 1980

[51] Int. Cl.³ .............................................. B64C 13/04
[52] U.S. Cl. .................................. 364/424; 244/223; 244/17.13
[58] Field of Search ................ 364/424, 571; 244/178, 244/194, 223, 17.13; 318/628

[56] References Cited

U.S. PATENT DOCUMENTS

| | | |
|---|---|---|
| 3,719,336 | 3/1973 | Fowler et al. .................... 244/17.13 |
| 3,733,039 | 5/1973 | O'Connor et al. ................ 244/17.13 |
| 4,078,749 | 3/1978 | Johnson, Jr. ......................... 244/178 |
| 4,294,162 | 10/1981 | Fowler et al. ....................... 244/223 |
| 4,313,165 | 1/1982 | Clelford et al. ..................... 244/223 |

Primary Examiner—Gary Chin
Attorney, Agent, or Firm—M. P. Williams

[57] ABSTRACT

A bias voltage, which can be added to force commands applied to a helicopter control stick actuator, to compensate for static null offset errors, is generated as the average of the summation or integral of actuator pressure, or pressure differential, sensed while the force is moved from a first position which is halfway aft through null to a second position which is halfway forward and back through null to the first position, the pressure readings which are averaged being taken only through the central portion of the motion, the motion being controlled to be extremely slow compared to normal permissible stick motion.

2 Claims, 4 Drawing Figures

HELICOPTER FORCE FEEL ACTUATOR AUTOMATIC STATIC NULL COMPENSATION

The Government has rights in this invention pursuant to Contract No. N00019-75-C-0267 awarded by the Department of the Navy.

TECHNICAL FIELD

This invention relates to systems which induce feel-force in aircraft control sticks by means of hydraulic pressure, and more particularly to improvements in null offset compensation therefor.

BACKGROUND ART

For some time, it has been known to utilize hydraulic actuators connected to the linkage of an aircraft control stick to provide force to the control stick which is dependent in some fashion upon the position of the stick and other aircraft parameters, to indicate to the pilot the degree of command caused by him, which in turn is an indication of the loading of the aircraft surfaces.

In such systems, the position of the stick and other parameters are monitored with suitable transducers and a corresponding force command is generated. As the pilot moves the stick, the force changes commensurately. Such systems also generally have a trim position, which is equivalent to the old style detent wherein the force is a null at a selected position, giving the stick positional stability when in the trim position. Any change in the trim position changes the position/force relationship provided by the force command generator.

Because such force feel systems actually provide a force input to a stick, any erratic behavior thereof will provide actual commands to the control system of the aircraft, unless such force is overcome by the pilot or any automatic flight control systems. For this reason, open-loop force commands are favored only if they are implemented in sufficiently complex systems which can monitor any faulty operation and overcome it, while at the same time not impairing desired operation.

The typical hydraulic force feel system employs hydraulic servo actuators, the mechanical output of which is effective in either the forward or the reverse direction of stick motion directly on the mechanical linkage associated with the cyclic stick. The hydraulic servo actuator is controlled by an electrohydraulic servo valve which has two outputs, one relating to each of the directions of motion of the hydraulic servo actuator, the outputs having together a differential hydraulic pressure which is a function of the magnitude and polarity of a force command signal applied to the valve, the differential hydraulic pressure output determining the force (by the ratio of the area) created by the actuator. Systems of this general type are illustrated in commonly owned U.S. Pat. Nos. 3,733,039 and 3,719,336. One problem with this type of system is that a true null position (zero force for zero electrical signal input to the servo valve) is hard to maintain for long time periods over wide variations of temperature of the hydraulic fluid utilized in the servo valve and the hydraulic servo actuator. Further, amplifier drift and other factors can result in long term drift of the null. To overcome this problem, the system described in commonly owned U.S. Pat. No. 4,078,749 includes means to sense conditions in which the differential pressure should be at a null, such as during trim release with small stick motion, measuring the differential pressure across the actuator at such times, and providing a compensation bias to the system as a function of the differential pressure, which compensation is applied until the next time that a null should occur, when the compensation can be updated. This has the obvious drawback of being intermittent in keeping up-to-date on the offsets, since it does not operate continuously. In addition, this type system does not accommodate changes in hysteresis, bias, linearity and the like which occur at other than the null position.

In many servo systems, it is possible to provide closed-loop control working around a null command. For instance, in a position servo, it is possible to command a certain position, and when that position is reached as indicated by feedback signals, the command is reduced to zero. Any variation in the command results in a command error signal for repositioning the device. In such devices, the use of proportional, integral and other gains in the servo loop is relatively straightforward. However, in hydraulic force feel actuators of the type described herein, a nulling servo loop is not generally possible because the utilization of the pressure control servo valve is preferred for variety of design reasons. In such systems, the maintenance of a given pressure by the force actuator is achievable only by maintaining a differential pressure across its inputs, which in turn requires maintaining a continuous pressure command (for the desired force) at the input of the pressure control servo valve. Therefore, nulling-type servo principles cannot be employed.

Dynamic nulling to compensate for variations in the pressure control valve has been provided in a commonly-owned, copending, U.S. patent application of Clelford and Fowler, Ser. No. 087,616, now U.S. Pat. No. 4,313,165 filed Oct. 23, 1979. Therein, the pressure difference of hydraulic fluid applied to a force feel hydraulic actuator under control of a pressure control servo valve is fed back in a direct non-nulling loop that provides partial, proportional negative feedback to the signal commanding the pressure control servo valve and is also fed back in a remote loop that provides limited, nulling integral feedback to the signal commanding the pressure control servo valve. That system provides improved hydraulic force feel actuator operation in a non-nulling servo loop by means of a specifically controlled combination of direct, partial, proportional feedback and indirect, nulling integral feedback, to overcome instability, hysteresis and drift problems, and provides a measure of compensation against castastrophic failures in the force feel actuator system.

In that prior system, compensation was also provided for static null. Static null offsets, as is known, result from offsets in the hydraulic servo valve, variable friction of the mechanical control connections, differential pressure sensor (transducer) offsets, and errors in the flight control stick balance springs. The mill detent design force must be high enough to overcome all of the static forces; if the static forces of two opposite directions are unequal (null set) the design detent force must be high enough to overcome the larger of them. Thus, the more accurately the null offset can be compensated, the lower the detent force which can be employed. To provide an electrical signal value to offset these static null errors, previous static null offset systems use a manually adjusted potentiometer to create a bias, and a spring gage to measure the symmetry of control stick forces, as the bias is adjusted to various values. When the measured control stick forces seem to be completely symmetrical about the null point, the bias is deemed to be accurate. This procedure is performed by the pilot as a preflight procedure when the aircraft is on the ground. However, due to the relatively low force levels involved, it is difficult to accurately measure force symmetry with a spring gage because the friction in the control can add or substract from the measured force. Further, the rate of motion in either direction should be equal during the many iterations required to achieve the balance. Also, the spring force is measured just at the force required to start movement of the stick out of the null position, which is critical. The use of a manual method to provide an electrical signal for use as a static null offset bias is not very accurate and thus requires a higher detent force to overcome the control mechanism static friction.

DISCLOSURE OF INVENTION

Objects of the invention include improvements in automatic helicopter control stick static null offset compensation.

According to the present invention, signals are generated to force the control stick of an aircraft to move to a position which is some significant fraction of full authority in a first direction, then slew the control stick back at a very slow rate through the null position to an equivalent significant fraction of full authority in the opposite direction, and then back to the position in the first direction, the differential pressure across the force actuator being measured only through some portion of the motion around null, this pressure differential being essentially integrated and averaged to find the average force required to operate the stick around null, an average of the force required in two directions being used as the static null offset compensation bias during normal operations of the force augmentation system while in flight.

The invention provides a very accurate compensation for static null offsets, provides compensation in an automatic and repeatable fashion, and thereby allows operation of a force augmentation system with a desirably low detent force. The invention also assures that actual stick force will be suitably close to desired, commanded stick force.

The present invention may be implemented in analog or digital control systems utilizing apparatus and techniques which are readily available in the art, in the light of the detailed teachings which follow hereinafter.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
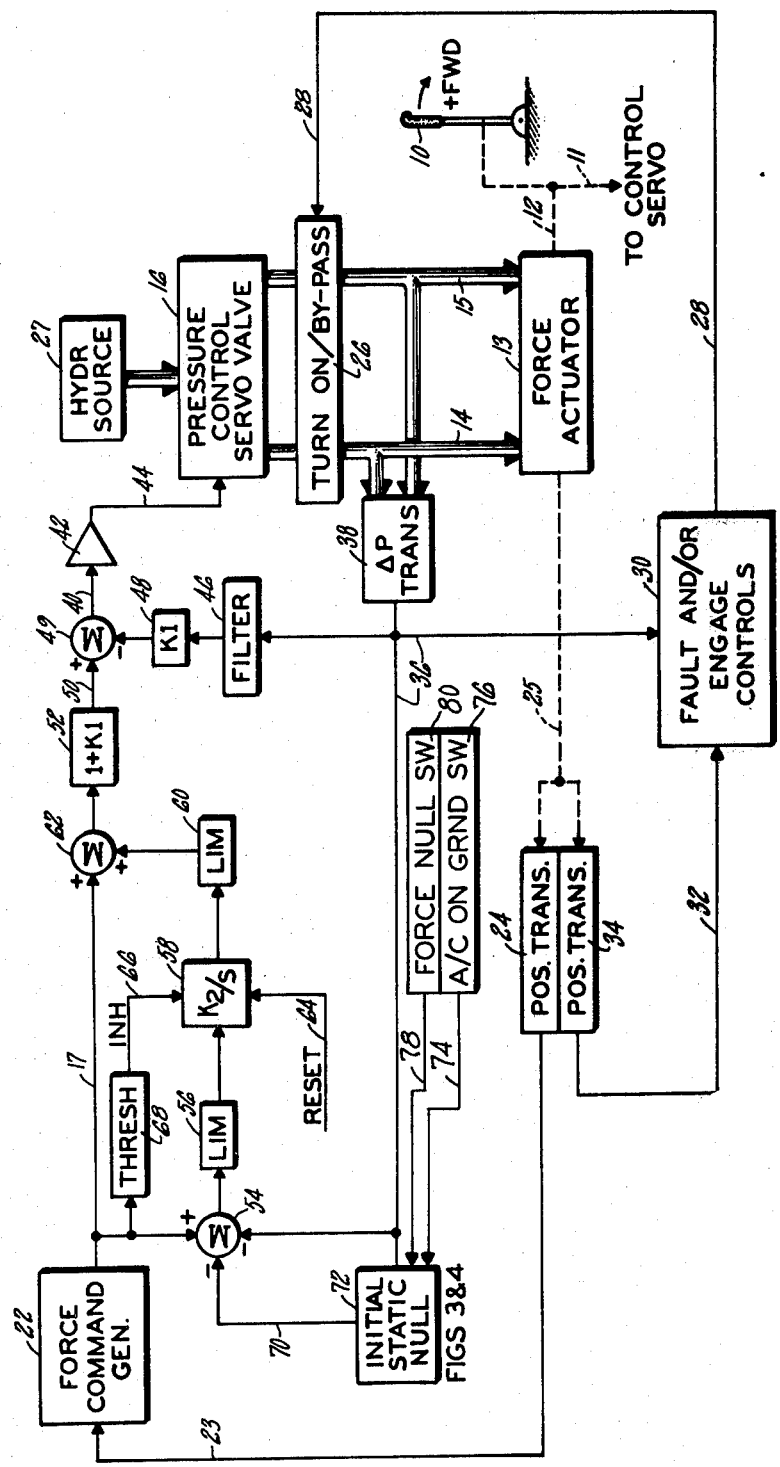
FIG. 1 is a simplified, illustrative block diagram of a general embodiment of a hydraulic force feel system of the prior art in which the invention may be incorporated.

Referring now to FIG. 1, a force augmentation system (FAS) recently introduced to the prior art utilizes hydraulic force to provide feel to the control stick 10 of an aircraft, which is assumed for exemplary purposes herein to be the pitch (longitudinal) axis of the cyclic pitch stick of a helicopter.

The stick 10 is provided with mechanical connections 11 to a control servo which include connections 12 to a force actuator 13 which provides a force in either a plus (nose down) or minus (nose up) direction to the stick 10 in response to the difference in hydraulic pressure applied thereto on hydraulic lines 14 and 15, under the control of a pressure control servo valve 16. The servo valve 16 provides a pressure difference between the lines 14 and 15, depending upon the desired magnitude and direction of force, under control of a raw force command signal on a line 17 generated as a function of stick position by a force command generator 22 which may, for instance, be of the type disclosed in U.S. Pat. No. 3,733,039, or it may be of other suitable types. The force command generator is responsive to a stick position signal on a line 23 which is provided by a position transducer 24 which has mechanical connections 25 through the force actuator 13, and other mechanical connections, to the cyclic stick 10.

The servo valve 16 receives hydraulic fluid under pressure from a source of hydraulic fluid under pressure 27 and applies pressure signals through a FAS turn-on bypass valve 26 to the actuator 13. Although not shown, the hydraulic system includes hydraulic return lines, in the well known fashion. The pressure control servo valve 16 may be of the type disclosed in U.S. Pat. No. 3,862,730. The turn-on valve either connects the servo valve 16 to the force actuator 13, or it disconnects it, and provides bypassing between the lines 14, 15 so as to provide hydraulic damping to the force actuator 13 when the FAS system is disengaged.

The turn-on valve is caused to engage and provide the hydraulic actuator force by means of a turn-on signal on a line 28 which may be provided in any suitable way such as by fault and/or engage controls 30, which may be of the type described in commonly owned copending application Ser. No. 060,093, filed on July 23, 1979 by Fowler and Clelford and entitled FORCE FEEL ACTUATOR FAULT DETECTION WITH DIRECTIONAL THRESHOLD, now U.S. Pat. No. 4,294,162, or it may be a simple engage circuit, or other suitable apparatus. If the engage controls 30 include fault monitoring, they may receive positional information on a signal line 32 from an additional position transducer 34, or from a single position transducer 24 if redundant safety is not required. The fault controls of the apparatus 30 also require a differential pressure feedback signal on a line 36 which may be provided by a differential pressure transducer 38, in the manner described in the aforementioned copending application Ser. No. 060,093.

Dynamic null compensation may be provided by feedback loops which utilize the pressure signal on the line 36 to provide feedback modification of the raw force command signal on the line 17 before it is applied on a line 40 to the input of a servo amplifier 42 so as to provide a suitable command signal on a line 44 at the electric input to the pressure control servo valve 16. The principal feedback loop may include a filter 46, whenever such is deemed necessary so as to reduce potential for oscillations or to filter out noise or the like, the characteristics of which depend solely on the particular embodiment being implemented, determined with well known techniques. The feedback signal may pass through an amplifier 48 having a gain K1, the output of which is substracted in a summing junction 49, which may comprise the inputs to the amplifier 42 in the well known way, from a signal on a line 50 which is provided by an amplifier 52 with a gain, 1+K1, which is so related to the gain of the amplifier 48 that a full signal will be provided on the line 44 during normal operation; this is because a null cannot be provided to the pressure control servo valve 16 unless a zero pressure (zero force) is desired. The feedback path through the amplifier 48 will reduce the signal on the line 50 by the proportion of K1 to a gain of 1, to provide the signal on the line 40. Assuming, for example, that K1=1, then the signal on the line 40 will be reduced by one-half from the signal on the line 50, when the entire system is operating ideally in a steady state condition.

The feedback just described, being limited to some fraction (K1/K1+1) cannot reduce any errors to zero, but it can provide instantaneous and significant reduction of any errors, with few instability constraints. In order to reduce long term errors to zero, an additional feedback path is provided which is upstream of the amplifier 52. This path provides the difference between the force command signal on the line 17 and the pressure difference signal on the line 36, in a summing junction 54, to provide (in some cases) a fully-nulled error signal to a limiter 56, the output of which is passed through an integrator 58 and an additional limiter 60 to a summing junction 62 which sums the integrated error with the force command signal on the line 17. The polarity at the summing junction 62 is such that the effect of the pressure difference signal on the line 36 is negative and therefore corresponds to degenerative feedback whereas the polarity of the component representing the force command signal is positive and represents a regenerative feed forward input.

The integrator 58 may be reset by a signal on a line 64 at convenient times, such as during a power-on reset or during a null balance while the aircraft is on the ground, in any well known fashion. In the present embodiment, the integrator 58 is inhibited from integration (that is, put into a hold state in which its output remains constant) by a signal on a line 66 in response to an output from a threshold detector 68 which provides such signal whenever the command force signal on the line 17 indicates an excessive force (such as more than 4 lbs.). This feature causes the integral feedback loop to be inoperative when there are large pressure differentials resulting from high pilot inputs due to rapid motion of the stick 10. Therefore, only the long term, small errors are zeroed out by the nulling, integral feedback loop; during fast motion of the stick, the proportional feedback loop through the amplifier 48 reduces errors substantially by some fraction. And, since the types of errors which can occur during the short term, while the pilot is in fact maneuvering the stick for a desired result, are of relatively lesser effect, reduction of such errors by a fraction (such as one half) on a rapid basis is quite adequate.

Taken together, the two feedback loops provide substantial, though less than complete, error reduction on a short term basis by means of a partial, proportional feedback, and also reduce long term, small errors to a complete nullity by means of the integral feedback loop.

The integral feedback is effective to completely null out all errors not accommodated by the short term proportional feedback loop because of the fact that the summation with the force command signal in the summing junction 62 is ahead of the amplifier 52, and therefore full unity gain of the combined signal from the junction 62 is available at the ouput of the summing junction 49.

The voltage limiter 56 limits the input to the integrator 58, thereby limiting the rate of change of the output of the integrator 58. This provides for a controlled rate of correction in the force command signal on the line 17. This may be eliminated, if desired in a given implementation. The limiter 60, on the other hand, limits the degree to which the force command signal can be dominated by the integral gain feedback loop. These limits may be adjusted to suit any given implementation of the invention. In some cases, either or both limiters may be eliminated where desired if the functions thereof are not needed, without departing from the invention. However, the limiter 60 prevents failures of the pressure transducer 38 from being compensated beyond a certain degree; this prevents the integral error compensation from masking faults. And the limiter 60 reduces catastrophic effects of faults in the integral gain loop.

Static nulls cannot be fully compensated in the loop through amplifier 48, so they are compensated through the integral loop. The function 54 has a static null compensating input on a line 70 generated during initialization by initial static null circuits 72, described in accordance with the invention hereinafter. The static null compensation is initiated, when the aircraft is on the ground by a ground null routine enabling signal on a line 74 from a conventional aircraft-on-ground switch 76, provided the pilot requests nulling, as indicated by a pilot force null signal on a line 78 from a pilot-actuated force null switch 80.

If desired, a small dither signal could be introduced at the junction 62, to overcome static drag and hysteresis.

The integral gain loop, including the summing junction 54, the limiters 56, 60, the integrating amplifier 58 and the summing junction 62, together with the amplifier 52, the force command generator 22 and the initial static null circuits 72 comprises signal processing means which may all be implemented in analog form as is illustrated in FIG. 1 and as described hereinafter, or they may be implemented in a digital computer, such as the type disclosed in a commonly owned copending application of Murphy and Clelford, Ser. No. 938,583, filed on Aug. 31, 1978, and entitled SELECTIVE DISABLEMENT IN FAIL-OPERATIONAL, FAIL-SAFE MULTI-COMPUTER CONTROL SYSTEM, now U.S. Pat. No. 4,270,168. In such case, the integral feedback loop may be implemented in a fashion illustrated in FIG. 2.

A digital implementation of the integral feedback loop may be performed in the embodiment of a computer system in said copending application Ser. No. 938,583 within step 1403 (FIG. 14), by commencing through an entry point 100 (FIG. 2, herein) to a test 101 which determines if there is a power on reset; if so, a step 102 will reset the integrator. If not, a test 103 will determine if the force augmentation system is turned off (as in, for instance, steps 1516, 1524a, FIG. 15 or step 1802, FIG. 18, of said copending application). If it is, no calculations are made. But if the force augmentation is not turned off, then a test 104 determines whether high raw force commands are being generated as a consequence of pilot stick motion. If so, no calculations are made, but if not, then a working factor referred to as "A" is generated as the difference between the raw force command and the pressure differences summed within the static null in steps 105 and 106 (which are equivalent to the summing junction 54 in FIG. 1). Then, "A" is multiplied by a gain and then by a fixed time increment, "T", and then is added to a previous integrated result to perform well known rectangular integration in steps 107 and 108, which are equivalent to the integrator 58 in FIG. 1. Thereafter, in step 109, the factor "A" becomes the sum of the integrator output and the original static null which provides the static null in a raw form in accordance with the invention as described hereinafter, in a feed-forward fashion, thereby obviating the need to take a long time to integrate upwardly to compenste for the static null error. This is different than the embodiment of FIG. 1 and is illustrative of the various ways in which the invention may be incorporated into a system. If desired, the embodiment of FIG. 1 could have a summing junction provided to introduce the static null directly upstream of the integrator 58, in a well known fashion, thereby causing that embodiment to be more like the embodiment of FIG. 2. Then in steps 110 and 111, it is determined whether or not the total feedback factor exceeds a feedback factor equivalent to 2 lbs., and if it does it is corrected in steps 112, 113, depending upon the polarity. The basic output of the integral path itself is then set to the value "a" in step 114, after the 2 lb. limiting. In step 115, the integral output is corrected to equal the 2 lb. corrected output minus the static null, which is provided as described hereinafter, so that the value accumulated in the integrator itself will be such that, when added to the static null, should not exceed 2 lbs. This prevents the output of the integral path from continuously growing to values, which with static null added thereto, far exceed the 2 lb. limit; if such correction were not provided, inputs of an opposite sense would be masked by the excess of the integral output over the 2 lb. limit. By correcting any excessive integral output to a value of 2 lb.± static null value, any change in the sense (increasing or decreasing) of the force feel pressure will be immediately apparent in the limited output (step 114).

Step 115 is the last step of the pitch outer loop calculation equivalent to the integral feedback path. The integral feedback path output, FAS NUL, is thereafter added to the raw force command signal and multiplied by the constant 1+K1 in an obvious manner, which may be implemented in the aforementioned copending application in subroutine 519 (FIG. 9) and again in subroutine 904 (FIG. 9) of the aforementioned copending application, which subroutines provide two pitch force augmentation calculations in each overall macro synch interrupt (each basic computer cycle). And the results of these calculations may be outputted to the analog portion of the system (such as summing junction 49 in FIG. 1) by step 703 (FIG. 7) and step 1003 (FIG. 10) in the aforementioned copending application.

The actual generation of the force command, as indicated by the force command generator 22 in FIG. 1, may be implemented using ordinary programming techniques to provide the functions set forth in the aforementioned U.S. Pat. No. 3,733,039. Or, it may be implemented in a different, suitable format in accordance with the skill of the art.

The feedback system has been described thus far in terms of a single channel of feedback. As described in the aforementioned copending application, however, it may as well be implemented in a system utilizing two control channels, with half of the gain for the pressure control servo valve 16 being provided by each control channel, whether the control systems are implemented by suitable programming of a digital computer as described in the copending application, or by dual analog circuitry of the type described in FIG. 1 herein. In such case, the position transducer 24 for one of the channels may provide the fault detection for the other channel and the position transducer 34 for the other channel might provide the fault detection for the first channel (as in FIG. 1). Similarly, a feedback test to determine the viability of the actual pressure differential on the line 36 may be performed, as indicated in steps 1006 and 1012–1016 in FIG. 10 of the aforementioned copending application, each channel comparing its pressure transducer to that of the other. Also, the fault and/or engage controls of FIG. 1 herein could use a differential pressure signal provided by a second pressure transducer, for redundant safety in a single channel embodiment, if desired. However, the use of single or dual channels, half or full gain, feedback tests, fault detection and the like form no part of the present invention, and are deemed to be within the skill of the art.

The detailed description thus far is essentially that of the prior art system disclosed in the aforementioned copending application Ser. No. 087,616.

Figure 2:
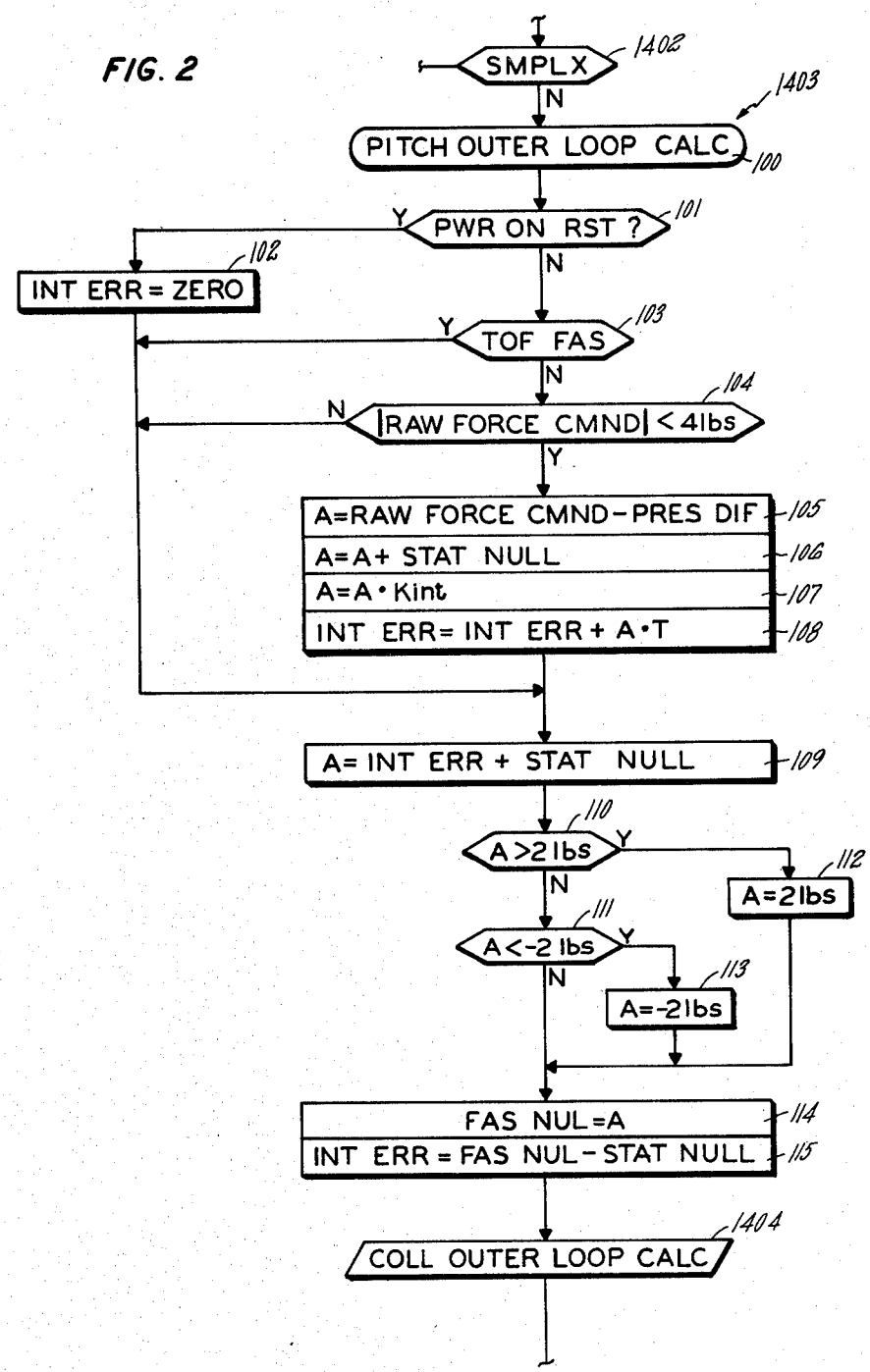
FIG. 2 is a logic flowchart illustrative of a program for using the static null compensation value generated in accordance with the present invention in a computer embodiment.
Figure 3:
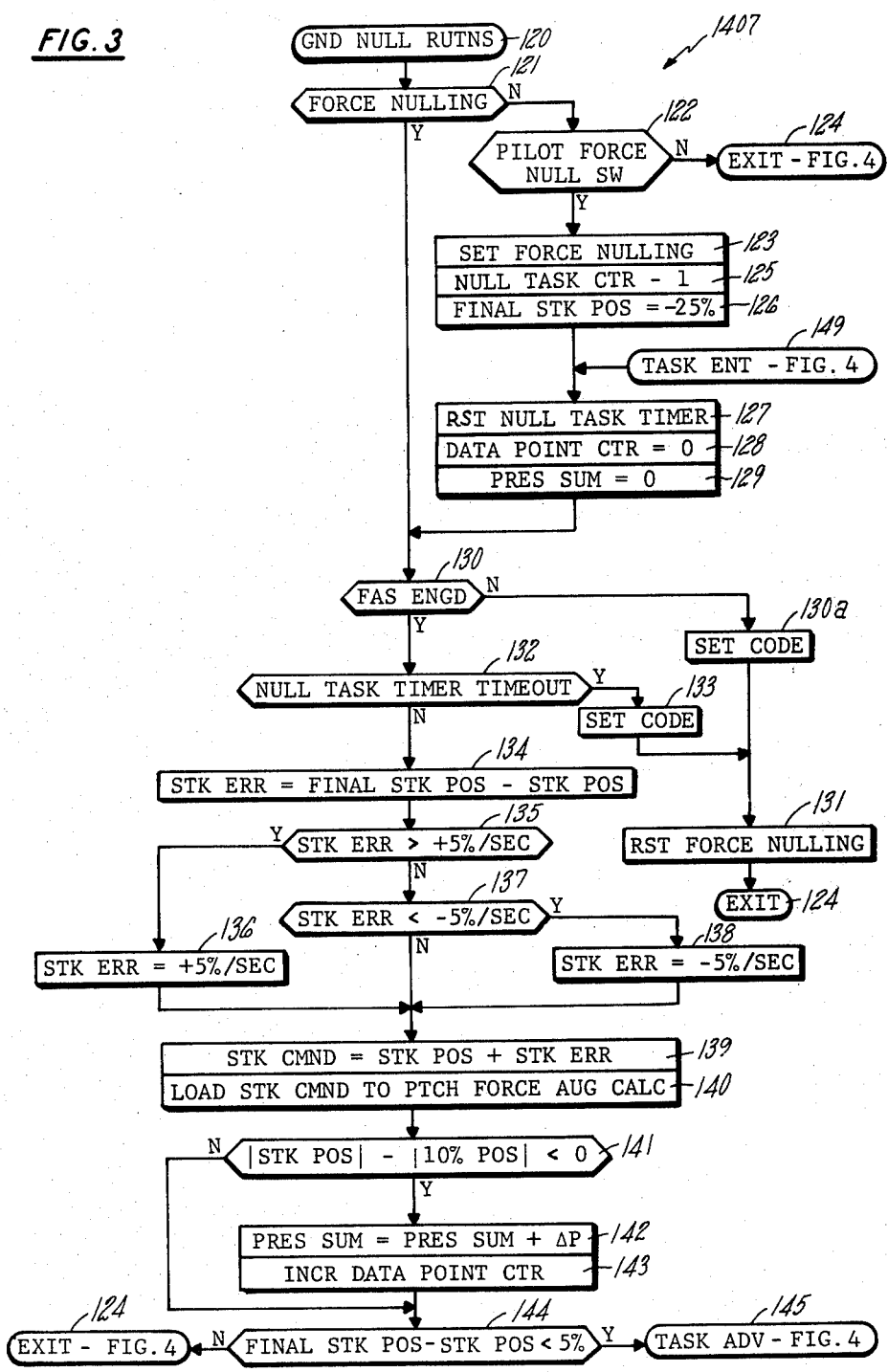
FIGS. 3 and 4 are a logic flowchart illustrative of a program for carrying out a portion of the present invention in a digital computer embodiment.
Figure 4:
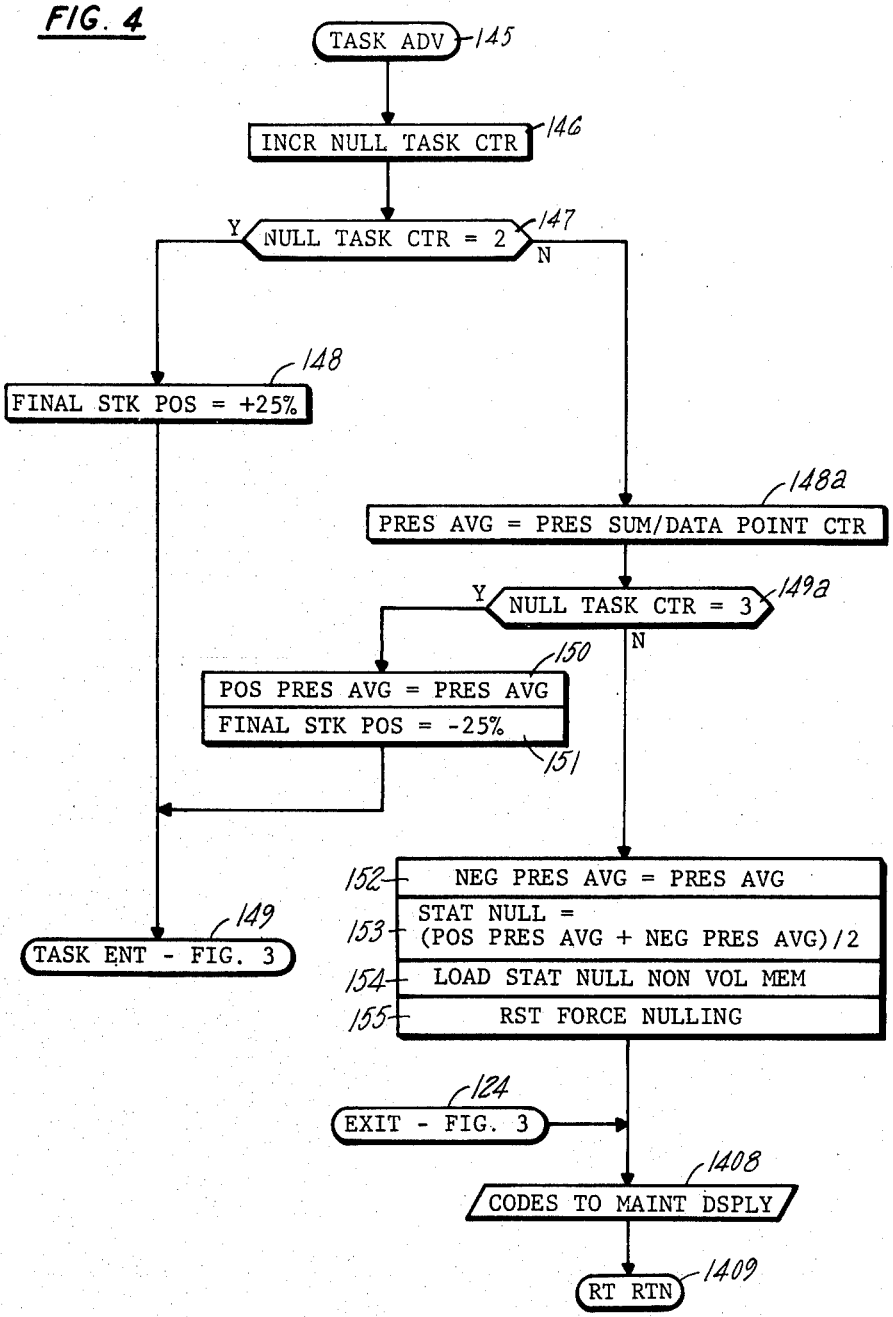

Considering first a digital embodiment of the present invention, the static null value utilized in FIG. 2 is provided, in accordance with the present invention, in a manner illustrated in a routine depicted in the flowchart of FIGS. 3 and 4. This routine may, in the aforementioned copending application Ser. No. 938,583, in fact comprise the ground null routines 1407 illustrated in FIG. 14 of said copending application. This routine is reached, in response to the signal on line 74 from the aircraft-on-ground switch 76, through an entry point 120 and a first step 121 checks a local force nulling flag to determine if the routine has already been in progress or not. If not, a test 122 determines if the pilot has energized the force null switch 80 so as to cause generation of the static null compensation value. If he has not, the entire routine is exited by means of an exit transfer point 124, which causes (as seen in FIG. 4) the program to reach the next step of the autopilot 3 routine, which comprises the codes to maintenance display subroutine 1408 in FIG. 14 of said copending application.

In FIG. 3, if step 121 is negative but step 122 is affirmative, meaning that the static null compensation generating program of the invention is being initiated, an affirmative result of test 122 will yield a step 123 which sets the force nulling flag that is tested in test 121, to keep track of the fact that the subroutine has been initiated in subsequent iterations through the ground null routines 1407 of FIGS. 3 and 4 herein. Then a step 125 sets a null task counter equal to 1. As is described hereinafter, this is a local counter utilized to step the ground null routines through successive tasks or phases. Then a step 126 sets a final stick position value as equal to −25% authority. This establishes a desired stick position for initiating the routine which is one-half of full displacement in the aft direction (under the convention that full authority is from full forward to full negative and therefore the authority is expressed as ±50%), since the routine in this embodiment is arbitrarily chosen to begin with the stick in the aft position, push the stick into the forward position, and return the stick to the aft position. However, it could be done in the reverse order if desired as will be apparent hereinafter.

In FIG. 3 the next step 127 is to reset a null task timer that is utilized as a program watchdog timer to ensure that the stick has not become jammed and that no other factor has caused the program to be incompletable. Then a step 128 will reset a data point counter to an initial count of zero and a step 129 will provide an initial pressure sum value equal to zero.

The steps 123, 125, 126 are initialization steps that are performed only when the ground null routines of the invention are entered the first time; the steps 127-129 are task initialization steps which are performed for each advance of the task counter as is described more fully hereinafter.

In each pass through the routine, whether it requires routine initialization or task initialization, or neither of these, a test 130 ensures that the force augmentation system is engaged. If it is not, an appropriate fault code is set in a step 130a and the force nulling flag (which is tested in test 121) is reset by a step 131, and the program will exit through the exit point 124 as described hereinbefore. On the other hand, if the force augmentation is still engaged, test 130 will be affirmative, causing a test 132 to determine whether the null task timer has timed out or not. If it has, there is an indication that the process is taking too long (as may be the case if the stick is blocked so that it cannot advance to the desired positions as described hereinafter), indicating that the program will hang up if allowed to remain in this routine. Therefore, a fault code is set in a step 133 and the step 131 will reset the force nulling flag, and the program exited, as described hereinbefore.

However, if things are proceeding properly, and too much time has not elapsed, test 132 will be negative leading to a step 134 in which a factor relating to a desired increment of stick position, referred to as stick error, is set equal to the desired final stick position, which in task 1 (the first iterations through the program), is the −25% of authority position established in step 126, minus the present actual stick position. Actual stick position may be provided through direct memory access data moves from A to D converters responsive to a suitable position transducer such as the transducer 24 illustrated in FIG. 1 hereof. In other words, the stick error is the difference between the present stick position and a desired position which the stick should achieve. However, if the stick error is greater than a value determined, with respect to the repetition rate of performing the ground null routines of FIGS. 3 and 4, to represent a stick rate of 5% of authority per second, then a test 135 will be affirmative and cause a step 136 to limit the stick error to positive 5% per second. But if not, then a test 137 will determine if the stick error is more negative than a value equivalent to −5% of authority per second stick motion. If it is, then a step 138 will set the stick error to be equal to −5% per second. If both tests 135 and 137 are negative, then the stick error is not limited. Whether or not the stick error is limited, a step 139 will generate a stick command equal to the summation of present stick position and the stick error. If the stick is initially centered, the stick error will initially start out to be approximately equal to the −25% of authority to which the stick has to travel. Causing the stick to travel that entire distance within one 50 ms computer cycle would require a rate of hundreds of percent of authority per second. Thus, it is seen that the stick error is limited to ensure a very slow motion of the stick, which is one of the features of the present invention. The stick command value generated in step 139 is caused in step 140 to be loaded into a section of memory where it will be available for use in pitch force augmentation calculations, such as those performed once in subroutine 519 of FIG. 5 of said copending application and again in subroutine 904 in FIG. 9 of said copending application, the dual performance providing two calculations during each macro synch, as is described hereinbefore. However, it should be noted that this pitch force augmentation calculation is being done while the airplane is on the ground in conjunction with the ground null routines. When the airplane has left the ground, the pitch force augmentation calculations provided in those two subroutines is related to autopilot functions and includes the nulling described with respect to FIG. 2 hereinbefore, and in fact utilizes the null offset compensation factor which the present invention provides in those airborne pitch force augmentation calculations. Thus, pitch force augmentation calculations are utilized on the ground to provide the data necessary to determine what the null offset compensation bias should be, and are utilized in generating airborne stick command signals which are provided static null compensation (FIG. 2 herein) by such bias (STAT NULL).

In FIG. 3, a test 141 determines if the absolute value of the present stick position is within 10% of full authority from the null position. This may be achieved in a single step if absolute values are taken as illustrated by the test 141, or it may be tested separately by comparing stick position against the positive 10% authority position and then later comparing it against the negative 10% authority position, in a manner similar to that described with respect to the tests 135, 137, hereinbefore. If test 141 is affirmative, this means that the stick is traveling within that portion of its position close to the null position which is approximately two-fifths of the distance between the final stick position called for in step 126 and the null position. If test 141 is affirmative, then the pressure difference across the force actuator is added to an integration value, referred to as pressure sum, which had been initiated at a zero value in step 129, hereinbefore. The pressure difference may be that indicated in analog fashion by the signal on the line 36, FIG. 1, and read through A/D converters and loaded into memory by direct memory access data moves as described in said copending application. Each time that a data value of pressure difference is added into the pressure sum value, the data point counter is incremented to keep track of how many increments of data have been added therein, in a step 143.

In FIG. 3 step 143 completes the stick motion and data collection and integration process, which is the essential process of the present invention. Then, a test 144 compares the present stick position with the final stick position (such as, in task 1, that initially set in step 126) and if the present stick position is within 5% of full authority from the final stick position, the particular task is deemed to be complete, and a task advance subroutine illustrated in FIG. 4 is reached by means of a transfer point 145. But, prior to the time that the actual stick position comes within 5% of full authority from the final desired stick position, test 144 is negative and causes the program to exit through the exit transfer point 124, leading to the return described hereinbefore with respect to FIG. 4.

In FIG. 4, the task advance portion of the subroutine reached through the transfer point 145 begins with a step 146 which advances the null task counter, which had been initiated at a setting of 1 in step 125 during the routine initialization described hereinbefore with respect to FIG. 3. The first time that the ground null routines pass through step 146, the null task counter will be incremented from 1 to 2; this means that the first portion of the subroutine is completed and the second portion of the subroutine should begin. This is determined by a test 147, an affirmative result of which yields to a step 148 that simply changes the final desired stick position value from the −25% value (set in step 126) to a +25% value. This causes the stick to move toward a second point halfway along the forward direction. Notice that any data which had been recorded and summed in step 142 of FIG. 3 during task 1 is not utilized for anything; however, the programming is simpler if the data is simply taken and ignored, since the stick is moving very slowly during task 1 from a null or other initial position to the first final stick position which is halfway aft as set by the step 126. Thus, task 2 establishes that the stick should move from halfway aft to halfway forward. After setting a new desired final stick position in step 148, the program advances through a task entry transfer point 149 and reenters that portion of the program described in FIG. 3.

Step 127 resets the null task timer so as to start timing out the second task to be sure that it does not get hung up. The data point counter is reset to zero and the pressure sum is reset to zero so that these values can reflect only the activity during task 2. In task 2, the stick is moved slowly (at the 5% per second rate described hereinbefore with respect to the limiting steps 136, 138, hereinbefore), as a consequence of each pass through the subroutine portion illustrated in FIG. 3 causing a new stick command to be generated. During the first passes through the subroutine within task 2, test 141 is always negative since the stick will take some time to advance from being halfway forward to being within 10% of the null point. In each of these passes through the subroutine, the test 121 at the top of FIG. 3 is affirmative so no reinitialization of any sort takes place and the only processes that are performed are the tests 130 and 132 (to be sure that the process may proceed), the generation of stick errors and stick commands, and loading the stick commands to the pitch force augmentation calculation portion of the program as described hereinbefore. Because test 141 is negative during these first few passes, and because the present stick position is a long way away from the desired final stick position, no other functions are performed and the subroutine is exited through the transfer point 124 at the bottom of FIG. 3. Eventually, after generating many new stick command signals, during a pass through the subroutine of FIG. 3, test 141 will become affirmative because the stick will finally have reached a point within 10% of null, and therefore data collection will begin by adding the digital value of the pressure difference to the pressure sum value in step 142, and incrementing the data point counter to record that fact, in step 143. But still test 144 will be negative and so the subroutine will be exited at the bottom of FIG. 3. This will proceed as the stick moves through the null position and into an aft position until the stick reaches 10% of authority in the aft direction. At that time, test 141 becomes negative and therefore the data collection and data point counter incrementing of steps 142 and 143 will thereafter be bypassed. This portion of task 2 therefore is similar to the initial portion of it, where the only function is to provide continuously incremented stick commands to cause the position of the stick to slowly creep towards the 25% aft position. The stick will continue to move until it gets within some threshold value of the final stick position, which can be taken to be 5%. Thus, when the stick actually reaches a position of 20% aft, test 144 can be affirmative causing the subroutine to advance through the task advance transfer point 145 to step 146 in FIG. 4.

This time, step 146 will increment the null task counter from 2 to 3 so that step 147 will be negative. When step 147 is negative it automatically means that either task 3 or task 4 is being performed. In both of these tasks, as is described more fully hereinafter, it is incumbent to take the pressure sum value and divide it by the count set in the data point counter to get an average pressure difference value for each of the data points taken between stick positions of 10% forward through null to stick positions of 10% aft, as described with respect to the data collection of task 2 hereinbefore. Thus, a step 148a will provide a pressure average equal to the accumulated pressure sum divided by the number of data items added into it as indicated by the data point counter. Then, a test 149a determines if the null task counter is set at 3. If it is, the specific functions to be performed during task 3 are implemented by a step 150 which causes the pressure average to be stored in a location identified as positive pressure average, and a step 151 which causes the desired final stick position to be set at 25% aft. Thereafter the subroutine advances through the task entry point 149 to perform task 3 within the subroutine portion set forth in FIG. 3.

Once again step 127 will reset the null task timer, step 128 will reset the data point counter to zero, and step 129 will reset the pressure sum so that it will equal zero. In task 3, the stick is moved very slowly from the 25% forward position which it had achieved in task 2 to the 25% aft position which is set in step 151 (FIG. 4) of task 3. This task proceeds in the same fashion as described with respect to task 2, only the direction of stick motion is opposite. Thus, in the first passes through the subroutine, test 121 is affirmative so that tests 130 and 132 are made to see if the program can proceed, a new stick error is computed and limited in steps and tests 134–138, a new stick command is generated and made available to the pitch force augmentation calculations by steps 139 and 140 and step 141 determines that the stick has not reached within 10% of null, and the program exits. Eventually, the stick will move sufficiently aft so as to be within 10% and null, and data collection begins by test 141 being affirmative during each pass through the program. Thus, the pressure sum is incremented in step 142 and the fact that it has been incremented is counted in step 143 in the same fashion as described with respect to task 2 hereinbefore. When the stick has moved through null and ultimately to a point which is 10% aft, in some pass through the subroutine of FIG. 3, test 141 will again become negative so that the only function is continuously incrementing the stick position slowly, until it comes within 5% of the desired final stick position, as indicated by test 144 being affirmative.

The routine will then once again pass through the task advance transfer point 145 to step 146 where the null task counter is now advanced from 3 to 4. Therefore, test 147 will again be negative and step 148a will generate a pressure average by dividing the pressure sum by the number of data points represented in it as indicated by the data point counter. Thereafter step 149 will be negative so the functions unique to task 4 will be performed. Specifically, a step 152 will store a negative pressure average equal to the pressure average generated in step 148a. This is equivalent to the positive pressure average stored in step 150 of task 3. Then a step 153 establishes the static null value used in the actual, airborne force nulling calculation described hereinbefore with respect to FIG. 2, by averaging the positive pressure average provided through steps 148a and 150 with the negative pressure average provided through steps 148a and 152. Then step 154 loads this static null value into a nonvolatile memory location (of the computer described in said copending application) so that it will be available throughout flight, even though there may be momentary interruptions in power to the flight control computer. This completes the ground null routines so the force nulling flag is reset in step 155. And the program is exited in the usual fashion and reaches the next subroutine of the sequence, which is the codes to maintenance display subroutine 1408 in said copending application.

Summarizing briefly, the subroutines described with respect to FIGS. 3 and 4 are passed through one way or another during each major pass through the computer program, such as each macro synch of the computer disclosed in said copending application, provided the aircraft is on the ground so that the ground null routines are reached. During passes prior to the pilot initiating force nulling by closing a switch, step 122 causes the program to immediately be exited without performing any functions at all. But once the pilot calls for force nulling, while the aircraft is still on the ground, then the entire subroutine is first initiated and the stick is slowly moved aft during task 1. Any data which may be collected in task 1 is ignored. Task 2 causes the stick to move from halfway aft to halfway forward, collecting data from 10% aft through null to 10% forward, and then task 3 averages that data and stores it as a positive pressure average. Task 3 then causes the stick to move from halfway forward through null to halfway aft, collecting data from 10% forward through null to 10% aft. Then task 4 averages the data collected during task 3 and stores it as negative data, and computes the actual static null offset compensation bias factor, referred to herein as static null, as the average of the position and negative pressure averages collected during the slow stick motion.

Aspects of the invention include the fact that the stick is first positioned way beyond the point where data collection is desired to be made, and slowly moved toward the point where data collection is to begin, and continued to be moved during data collection and past the point where data collection is complete. This provides a guaranteed displacement (between plus and minus 10% of null) across which the data is taken, and provides that the data is taken at the same rate of stick position change in every calculation. This tends to eliminate noise, variable friction and unbalance effects which could provide erroneous results. The fact that the data is only taken within the midportion of the actual, slow stick travel which is commanded eliminates effects of inertia, mechanical control mechanism backlash, stiction effects and damping, which could also cause variable results from one time to the next. And, averaging in both directions includes friction effects that differ with the direction of stick motion. Thus, the procedure of the invention described with respect to FIGS. 3 and 4 provides a static null offset compensation bias factor which is representatively average for the actual conditions of the stick in either direction, within close range of the null point where it is critical, for use in airborne force calculations.

Another important aspect of the present invention is that the actual stick motion capability of the force actuator is utilized to provide accurate stick motion, rather than variable and unrepeatable manual motion. In the embodiment described herein, the commands to move the stick are alternatives to the autopilot commands which are generated when the airplane is airborne. This is achieved simply by providing the desired value to the force augmentation calculations, which automatically test for the aircraft being on the ground, such as the test 1405 in FIG. 14 of said copending application, which leads to the ground null routines described herein, thereby causing the simple position calculations required to move the stick slowly to be carried out, rather than stick motion relating to airspeed hold or attitude hold functions which are normally provided by the autopilot routines when the aircraft is in flight.

The manner in which stick motion is effected (as a consequence of the stick command signal provided in step 139 and transferred to the force calculations in step 140 of FIG. 3 herein) is well known in the art and forms no part of the present invention. However, these calculations simply take desired stick position (which is equivalent to a synchronized desired airspeed to be held or attitude to be held) and multiply it by factors indicative of desired force as a function of position for application to the amplifier 52 of FIG. 1.

The invention may also be practiced in an analog fashion is desired. If an analog force augmentation system is used, such as that illustrated in the aforementioned U.S. Pat. No. 4,078,749, then the null offsets of the present invention may also be provided to such a system by analog means. All that is required is that when the aircraft is on the ground, an amplifier electrically generate a ramp voltage to command desired stick positions beginning at null, advancing slowly to half of the aft position, then advancing through null to half of the forward position, and then advancing back through null to half of the aft position. And, level detectors on the stick position sensor can initiate integration of pressure differences between positive and negative 10% of authority as described herein, and the integrated value can be divided by a factor equivalent to the time of the integration, and stored in a motor driven potentiometer or other non-volatile, storage device.

Thus, the invention may be performed in analog or digital apparatus in conjunction with various other force command functions which are described with respect to FIGS. 1 and 2 and in said copending application.

The portion of a force augmentation system illustrated in FIG. 1 which includes the amplifier 52, the position transducers 24 and 34 and everything depicted to the right thereof in FIG. 1, is normally implemented by analog apparatus. The remainder of FIG. 1 may preferably be implemented in a digital computer of the type described in said copending application, including the ordinary force command generator functions illustrated in the box 22 of FIG. 1, the closed-loop force null compensation illustrated in FIG. 2 herein, and the initial static null function of block 72 in FIG. 1 as described with respect to the digital embodiment of the invention illustrated in FIGS. 3 and 4 herein. On the other hand, as described hereinbefore, the remaining functions of FIG. 1 may be performed in an analog fashion, with force command being generated by apparatus within the box 22 herein, of the type illustrated in U.S. Pat. No. 4,078,749, the integral nulling illustrated to the left of FIG. 1, and initial static nulling using analog force generation and suitable analog stick position signal generating circuits or the like, as described hereinbefore.

Although the invention has been shown and described with respect to exemplary embodiments thereof, it should be understood by those skilled in the art that the foregoing and various other changes, additions and omissions may be made therein and thereto, without departing from the spirit and the scope of the invention.

We claim:

1. An aircraft control stick actuator system comprising:

a servo valve controlled hydraulic actuator connected to the control stick and operable to provide forces to the stick of a magnitude and direction proportional to electric signals provided to said servo valve;

pressure sensor means connected to said hydraulic force actuator to provide a pressure signal indicative of the force applied to said control stick;

means providing a position signal indicative of the position of the control stick;

means providing an aircraft on ground signal in response to the aircraft being on the ground;

means for providing a force nulling signal when control stick force feel actuator null offset error compensation bias is desired to be generated; and signal processing means operative in response to presence of said aircraft on ground signal and said force nulling signal, for providing to said servo valve, in response to said position signal, desired stick position command signals to cause the control stick to move from a first position which is a significant fraction of control stick authority in one direction through null to a second position which is a significant fraction of control stick authority in a second direction and thence back through null to said first position, and responsive to said position signal and said pressure signal during a significant portion of control stick motion between said first and second positions for providing a static null signal which is indicative of the average pressure represented by the pressure signal during said significant portion of control stick motion.

2. A force feel actuator system according to claim 1 wherein said signal processing means provides said desired stick position command signals in a manner to cause the control stick to move between said first and second positions at a rate which is very small in comparison with the normal rate of permissible stick motion.

* * * * *